US005452580A

United States Patent [19]
Smith

[11] Patent Number: 5,452,580
[45] Date of Patent: Sep. 26, 1995

[54] THERMAL ENERGY DIFFERENTIAL POWER CONVERSION APPARATUS

[76] Inventor: Kevin Smith, 10949 Scripps Ranch Blvd., San Diego, Calif. 92131

[21] Appl. No.: 344,099

[22] Filed: Nov. 23, 1994

[51] Int. Cl.$^6$ ............................ F01B 29/00; F01K 25/04
[52] U.S. Cl. .................................................. 60/531; 60/671
[58] Field of Search .................. 60/531, 671; 417/52, 417/208, 209, 105

[56] References Cited

U.S. PATENT DOCUMENTS

| | | | |
|---|---|---|---|
| 2,867,974 | 1/1959 | Wenander | 60/531 |
| 3,429,122 | 2/1969 | Pravda et al. | |
| 3,670,495 | 6/1972 | Leffert | |
| 3,846,984 | 11/1974 | Siegel | 60/531 |
| 3,916,626 | 11/1975 | Schur | |
| 3,932,995 | 1/1976 | Pecar | 60/531 |
| 4,036,017 | 7/1977 | Siegel | |
| 4,081,965 | 4/1978 | de Geus | |
| 4,281,969 | 8/1981 | Doub, Jr. | 417/52 |
| 4,341,075 | 7/1982 | Backlund | 60/531 |
| 4,390,325 | 6/1983 | Elo et al. | 60/531 |
| 4,546,608 | 10/1985 | Shiina et al. | 60/649 |

Primary Examiner—Ira S. Lazarus
Assistant Examiner—Leonard Heyman
Attorney, Agent, or Firm—John R. Duncan; Frank D. Gilliam

[57] ABSTRACT

A thermal energy differential power conversion apparatus. A parallel series of vessels hold a working liquid at a level intermediate the upper and lower ends of the vessel. A first tube operatively engages the uppers ends of the vessels for carrying a liquid above the boiling temperature of the working liquid. A second tube is in contact with the liquid in each vessel for carrying a liquid at a temperature below the boiling temperature of the liquid. An outlet on each vessel directs heated working liquid under pressure from each vessel to a chamber for vaporizing the liquid and directing the resulting high pressure vapor to a work producing station, such as s scroll compressor operated in reverse as an expander. An inlet tube conveys low pressure vapor from the work producing station back to the vessels. Valves are provided in the tubes for selectively heating the liquid in each vessel to produce the high temperature, high pressure, liquid and for cooling the vessel to condense the returning low pressure vapor.

11 Claims, 2 Drawing Sheets

THERMAL ENERGY DIFFERENTIAL POWER CONVERSION APPARATUS

BACKGROUND OF THE INVENTION

This invention relates in general to apparatus for converting thermal energy into mechanical or electrical energy and, more specifically, to an apparatus utilizing a small temperature differential between two liquids to produce work.

A very great many devices have been developed for producing electrical power, operate mechanical devices, etc. using a variety of energy sources, such as chemical energy, solar energy, temperature differences and the like. While many of these are very effective for specific purposes, there is a continuing need for improved efficiency and the ability to use heretofore untapped sources of energy.

One potential source of energy lies in the small temperature differences between liquids such as the difference between the higher temperature of water at the surface of a lake or ocean and the lower temperature at depth, the warmer water in a surface pond and the cooler water in a well, tanks at different depths in the earth, etc. While a number of devices have been developed to utilize these small temperature differences in producing mechanical or electrical energy, they tend to be complex, expensive for the amount of energy converted and to have low conversion efficiency.

One such prior device is the expansible/compressible container system described by Backlund in U.S. Pat. No. 4,341,075 in which an expandable container is alternately expanded and contracted by alternately introducing warm gaseous refrigerant and cool condensed refrigerant into the container. While operable, this arrangement produces relatively little mechanical energy and is mechanically complex.

A number of different generators have been developed based on the heat pipe principle, such as those described by Shina et al. in U.S. Pat. No. 4,546,608, and Pravda et al. in U.S. Pat. No. 3,429,122. Although heat pipes excel for certain purposes under a narrow range of conditions, such as heating and cooling of buildings in certain climates, they tend to be expensive, complex and inefficient under many conditions.

Closed cycle vapor engines, such as are described by Leffert in U.S. Pat. No. 3,670,495 have been developed for a number of purposes, but have not reached a level of efficiency justifying widespread use. Other systems utilizing small temperature differentials have been conceived, such as turbine system described by Pecar in U.S. Pat. No. 3,932,995, the solar powered turbine described by deGeus in U.S. Pat. No. 4,081,965, the low pressure engine of Siegel as described in U.S. Pat. No. 4,036,017, and the heat vapor bubble engine described by Schur in U.S. Pat. No. 3,916,626. It appears that none of these has achieved a level of economy and efficiency necessary for significant commercial applications.

Thus, there is a continuing need for improved energy conversion apparatus for converting small temperature differentials into useful work, either through mechanical or electrical means. In particular, improvements in initial cost of the apparatus, less mechanical complexity and higher energy conversion efficiency are needed.

SUMMARY OF THE INVENTION

The above-noted problems, and others, are overcome in accordance with this invention by thermal energy differential power conversion apparatus which basically comprises one (or preferably a series in parallel) vessel for holding a working liquid at a level intermediate the upper and lower ends of the vessel, a first tube operatively engaging the upper end of the vessel for carrying a liquid at a temperature above the boiling temperature of the working liquid, a second tube in contact with the liquid in the vessel for carrying a liquid at a temperature below the boiling temperature of the liquid, an outlet for directing heated working liquid under pressure from said vessel, a chamber for vaporizing said liquid and directing the resulting high pressure vapor to a work producing station, an inlet tube for conveying low pressure vapor from the work producing station back to the vessel and valves in the tubes for selectively heating the liquid in said vessel to produce the high temperature, high pressure liquid and for cooling the vessel to condense the returning low pressure vapor.

Thus, when there is a high level of liquid in the vessel, the system will be in the "power" portion of the cycle, with higher temperature liquid heating the working liquid and the cooler liquid shut off. As high temperature and pressure liquid is passed to the vaporization container, the liquid level will drop. At a selected point, the valves in the higher temperature inlet line and the high temperature working liquid outlet line are closed and valves in the low pressure vapor inlet line and the cool liquid inlet line are opened and the vessel begins the "condensing" portion of the cycle. As vapor is condensed, the liquid level rises until a selected level is reached, at which points the valves are reversed and another power cycle is begun.

For efficient operation, one vessel should be in the power portion of the cycle when the other is in the condensing portion of the cycle. Any suitable number of vessels may be arranged in parallel.

Individual vessels may be switched between the two portions of the cycle either manually or under automatic control. For automatic control, any conventional liquid level measuring means may be used to measure the level of the liquid in a vessel and initiate the cycle change at selected levels. Since the temperature of the vessel wall will be different above and below the liquid level, a strip of conventional thermotropic material, which changes color with temperature difference, having a different color above and below the liquid level, may be applied along the exterior of the vessel. Optical sensors at selected locations near each end of the vessel will detect the color shift when the level passes the sensor and send a cycle change signal to a conventional controller. While any suitable valves may be used, solenoid valves are preferred because of their suitability for use with automatic control systems.

For highest efficiency, two counterflow heat exchanger are provided, one in the cool liquid line and the other at the container that receives high temperature, high pressure, liquid from a vessel and further heats and allows that liquid to flash into high pressure vapor.

That this system has a number of advantages over prior energy conversion systems is apparent. Accordingly, it is an object of this invention to provide a thermal energy power conversion apparatus having improved efficiency. Another object of this invention is to provide a conversion system utilizing liquids having small temperature differences, which may be at approximately ambient temperature. A further object of this invention to provide a conversion system that is simple and inexpensive to construct. Yet another object of this invention is to provide an conversion system which is capable of simple and inexpensive automatic control.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
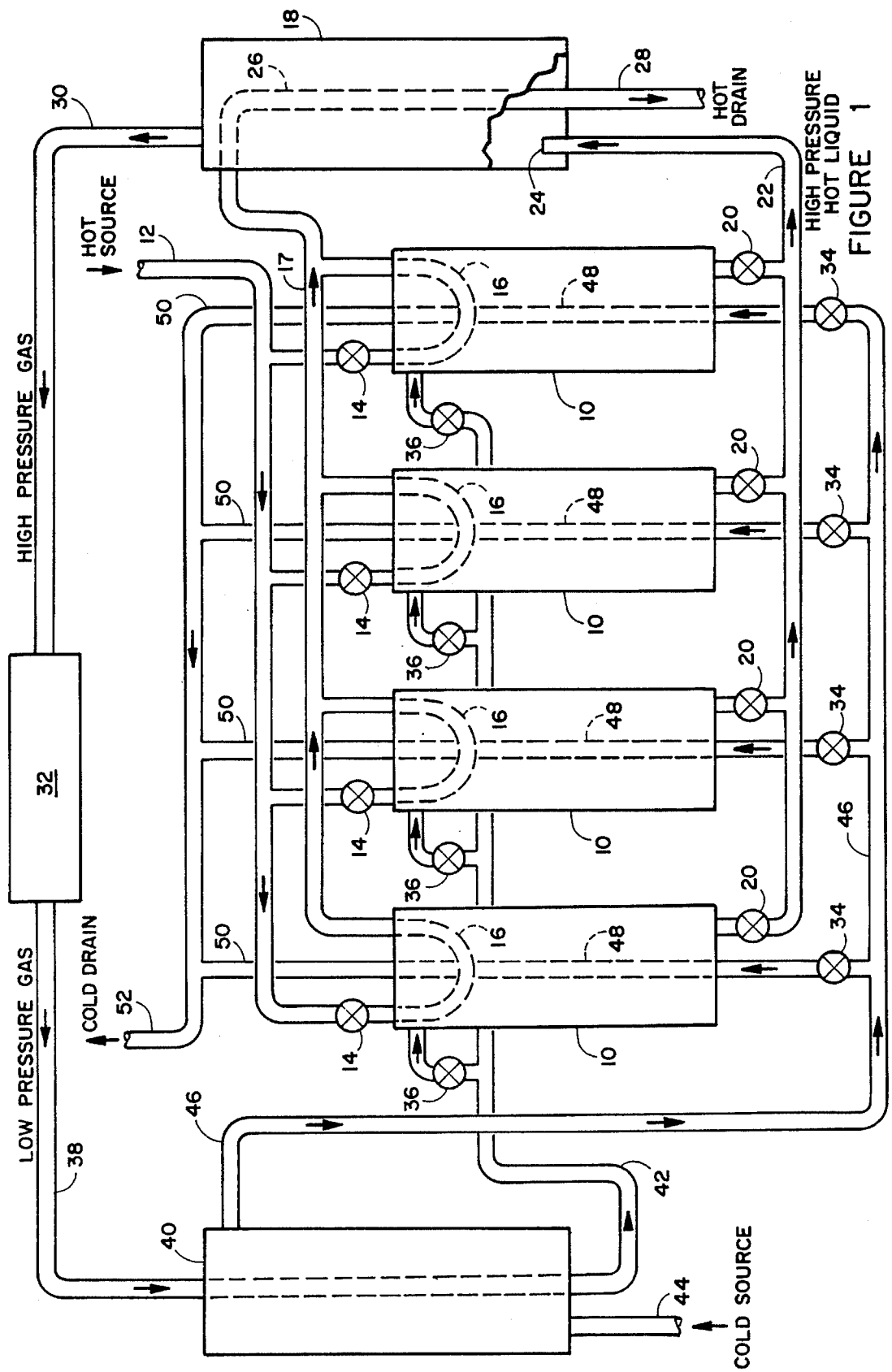
FIG. 1 is a schematic diagram of the energy conversion apparatus of this invention.

Referring to FIG. 1, there is seen a schematic diagram of the energy conversion apparatus of this invention, in this case utilizing four heating and cooling vessels 10 arranged in parallel. Each vessel 10 operates in a cycle that alternates between a heating or power cycle portion in which the liquid in the vessel is being heated and pressurized, then directed to a work station and a cooling or condensing cycle portion in which vapor returned from the work station is condensed.

Hot liquid enters the system through line 12. The hot liquid may be any suitable liquid, although in most cases the most economical source is water from a natural source. Preferably, the entering hot water will have a temperature of from about 150° to 200° F. and the cold from subfreezing to 100° F.

The hot liquid passes through any of valves 14 that are open, as they would be for any vessel 10 that is in the power cycle portion (generally, from 1 to 3 of the valves 14 are open at one time). The hot liquid then passes through a tube 16 within vessel 10 and located above the highest liquid level. The heated tube maintains a vapor atmosphere above the liquid level, transfers heat to the liquid in the vessel and pressurizes the vessel. Tube 16 may have any suitable configuration and can be located within vessel 10 as shown or may be incorporated in the wall of the vessel or may be bonded to the exterior of the vessel wall (as seen in the FIG. 2 embodiment). Tube 16 may be in the form of a loop or coil and may have any suitable number of turns. While tube 16 may be formed from any suitable material, copper or other metal having high thermal conductivity is preferred.

Hot liquid exiting tubes 16 passes through line 17 to counter current heat exchanger 18, which may be of any suitable conventional design.

Meanwhile, high temperature, high pressure liquid passes through the corresponding valve 20 (which will be open for any vessel 10 that is in the power cycle portion) and line 22 to heat exchanger 18. The liquid in this line is above its boiling temperature at atmospheric pressure, but is maintained as a liquid due to the high pressure at this point.

A nozzle 24 sprays the high pressure, high temperature, liquid into heat exchanger 18, which is at a pressure such that the liquid temperature is sufficient to cause the liquid to flash into vapor. Heat from tube 26 (which is carrying hot liquid) within heat exchanger further heats the vapor. The now largely cooled hot liquid passes from heat exchanger 18 to a drain through line 28.

The high pressure, high temperature, vapor passes through line 30 to work station 32 where the vapor is expanded while performing useful work. Work station 32 may be any suitable conventional device for converting the energy in the vapor to useful work, such a reciprocating "steam" engine, a turbine to generating electricity, a pump, etc. A particularly desirable expander is a conventional scroll gas flow compressor, run in reverse as an expander, producing rotary motion.

While one or more vessels 10 are operating in the power portion of the cycle, the others are operating in the condensing cycle portion. As each vessel 10 operates in the poser cycle portion, liquid is passed out of the vessel through a valve 20 and line 22, the liquid level lowers until a selected lower level is reached, at which time valves 14 and 20 are closed and valves 34 and 36 are opened.

In the condensing portion of the cycle, low pressure vapor from work station 32, stripped of much of its energy content, passes through line 38 to counter current heat exchanger 40 where the vapor is cooled, but not condensed, and passes through line 42 and any open valve 36 to one or more vessels 10.

Meanwhile, cold liquid enters heat exchanger 40 through line 44 to cool vapor entering from line 38, then (slightly warmed) passes through line 46 and any open valve 34 into a tube 48 running through vessel 10. Tube 48 may have any suitable configuration. A particularly preferred arrangement of tube 48 and means for gas/liquid contact is provided in FIG. 2. The vapor is cooled to its condensation temperature and gradually fills vessel 10. The cold liquid exiting tube 48 exits through line 50 to a suitable drain 52.

Once a vessel 10 is filled with condensate to the selected level, valves 34 and 36 are closed and valves 14 and 20 are reopened, beginning the next power cycle. As discussed above, the valves may be operated manually or under conventional automatic control in response to liquid level sensor signals.

Figure 2:
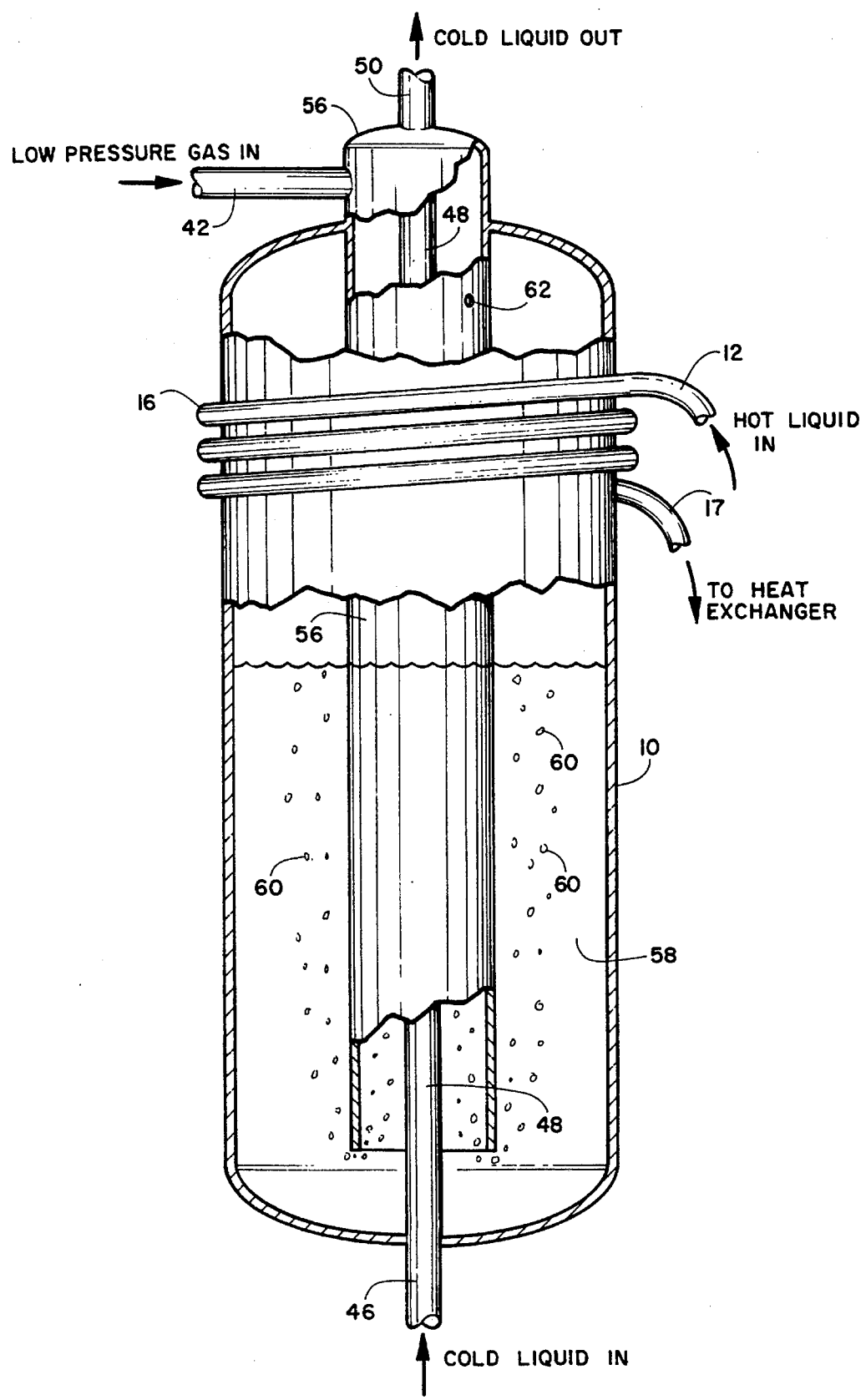
FIG. 2 is a schematic elevation view, partially cut away, of a preferred embodiment of a heating and cooling vessel.

FIG. 2 shows a schematic elevation view, partly cut away, of a preferred embodiment of vessel 10. As in the embodiment of FIG. 1, cold liquid enters the lower end of vessel through line 46 from heat exchanger 40 (as seen in FIG. 1) and passes out the top of the vessel through line 50 to drain.

In this embodiment, tube 16 is in the form of a coil around vessel 10 above the highest liquid level. Preferably, the wall of vessel 10 and tube 16 are formed from a metal having excellent thermal conductivity, such as copper or aluminum and tube 16 is brazed or soldered to the vessel wall for maximum thermal conduction.

Low pressure vapor from heat exchanger 40 (as seen in FIG. 1) enters a jacket 56 surrounding tube 48 through line 42. Jacket 56 is sealed to tube 48 at the upper end and is open at the lower end. Vapor moves down jacket 56, exits the lower end and passes up through liquid 58 as bubbles 60. The mixing of bubbles and liquid will assure maximum condensation. Depending on the velocity of entering vapor and the cross sectional area of jacket 56, the jacket may be substantially filled with vapor or a mixture of vapor bubbles and liquid of varying bubble/liquid proportions. While a jacket 56 reaching nearly to the bottom of vessel 10 is generally preferred, the jacket may be shorter or may be essentially eliminated, if desired.

A small hole 62 through the wall of jacket 56 above the maximum liquid level is provided to equalize pressure inside and out of jacket 56.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A thermal energy differential power conversion apparatus which comprises:

at least two vessels arranged for parallel operation, each for holding a working liquid at a level intermediate the upper and lower ends of said vessel;

said liquid having a selected boiling temperature;

a first tube operatively connected in a heat exchange relationship to the upper end of each vessel;

means for directing a first liquid at a higher temperature above said boiling temperature through said tube;

a second tube extending through each vessel at least partially lower than said first tube;

means for directing a second liquid at a lower temperature below said boiling temperature through said second tube;

inlet means for directing vapors of said working liquid into each vessel;

outlet means for directing working liquid from each vessel to a work producing station;

valve means for connecting one of said first tube to a source of said first liquid and said second tube to a source of said second liquid whereby said working liquid is boiled, said vessel is pressurized and said working liquid directed from said vessel is superheated when said first liquid is passing through said first tube and said vapor entering said vessel is condensed when said second liquid is passing through said second tube.

2. The apparatus according to claim 1 further including a first counterflow heat exchanger for receiving said working fluid from said vessels, further heating said working liquid and allowing said working liquid to flash into high pressure vapor.

3. The apparatus according to claim 2 further including means for directing said first liquid from a source of said first liquid at said higher temperature first through said tube and then through said heat exchanger as the heat exchanger heat source.

4. The apparatus according to claim 2 further including means for directing said high pressure vapor to a work station wherein energy is extracted therefrom and low pressure vapor is exhausted.

5. The apparatus according to claim 4 further including a second counterflow heat exchanger for receiving said low pressure vapor and removing heat therefrom and means for directing vapor exiting said second heat exchanger to said inlet means for return to said vessel and condensation of said vapor.

6. The apparatus according to claim 1 wherein at least three of said vessels are operatively arranged in parallel.

7. The apparatus according to claim 1 further including means for measuring the working liquid level in each vessel and means for operating said valve means to connect said first tube to a source of said first liquid when said working liquid level reaches a predetermined maximum level and for operating said valve means to connect said second tube to a source of said second liquid when said working liquid level reaches a predetermined minimum level.

8. The apparatus according to claim 1 wherein said first tube is coiled for at least one turn around said upper end of said vessel in contact therewith.

9. The apparatus according to claim 1 wherein said second tube extends substantially vertically through each vessel and said means for directing said second liquid through said second tube is arranged to direct said second liquid upwardly through said second tube.

10. The apparatus according to claim 9 further including a jacket around said second tube having an open lower end and a small opening above the maximum working liquid level and said inlet means is connected to said jacket for directing said vapors thereinto.

11. The apparatus according to claim 10 wherein said open lower end extends to below the minimum working liquid level.

* * * * *